US008227756B2

(12) United States Patent
Harchanko

(10) Patent No.: US 8,227,756 B2
(45) Date of Patent: Jul. 24, 2012

(54) APPARATUS FOR FLAME DISCRIMINATION UTILIZING LONG WAVELENGTH PASS FILTERS AND RELATED METHOD

(75) Inventor: Johnathan Samuel Harchanko, New Market, AL (US)

(73) Assignee: Knowflame, Inc., Huntsville, AL (US)

( * ) Notice: Subject to any disclaimer, the term of this patent is extended or adjusted under 35 U.S.C. 154(b) by 317 days.

(21) Appl. No.: 12/491,205

(22) Filed: Jun. 24, 2009

(65) Prior Publication Data

US 2012/0061573 A1    Mar. 15, 2012

(51) Int. Cl.
*G01J 5/02* (2006.01)
(52) U.S. Cl. .................................. 250/339.15
(58) Field of Classification Search ............... 250/339.15
See application file for complete search history.

(56) References Cited

U.S. PATENT DOCUMENTS

| | | | |
|---|---|---|---|
| 4,270,613 A | 6/1981 | Spector et al. | |
| 4,455,487 A | 6/1984 | Wendt | |
| 4,765,413 A | 8/1988 | Spector et al. | |
| 5,103,096 A | 4/1992 | Wong | |
| 5,311,167 A | 5/1994 | Plimpton et al. | |
| 5,339,070 A | 8/1994 | Yalowitz et al. | |
| 5,373,159 A | 12/1994 | Goldenberg et al. | |
| 5,612,676 A | 3/1997 | Plimpton et al. | |
| 5,625,342 A | 4/1997 | Hall et al. | |
| 5,995,008 A * | 11/1999 | King et al. | 340/578 |
| 6,057,549 A | 5/2000 | Castleman | |
| 6,064,064 A | 5/2000 | Castleman | |
| 6,239,435 B1 | 5/2001 | Castleman | |
| 6,518,574 B1 | 2/2003 | Castleman | |
| 6,756,593 B2 | 6/2004 | Nakauchi et al. | |
| 6,818,893 B2 | 11/2004 | Carter | |
| 6,914,246 B2 | 7/2005 | Servaites et al. | |
| 7,144,834 B2 * | 12/2006 | Clasen et al. | 501/58 |
| 7,256,401 B2 | 8/2007 | Garmer et al. | |
| 7,297,970 B2 | 11/2007 | Yamagishi et al. | |
| 7,333,129 B2 | 2/2008 | Miller et al. | |
| 7,361,948 B2 | 4/2008 | Hirano et al. | |
| 2002/0043623 A1 * | 4/2002 | Galloway | 250/339.02 |

FOREIGN PATENT DOCUMENTS

| | | |
|---|---|---|
| EP | 0973019 | 1/2000 |
| EP | 973019 A1 * | 1/2000 |
| WO | WO 03/062808 | 7/2003 |

* cited by examiner

*Primary Examiner* — David Porta
*Assistant Examiner* — Hugh H Maupin
(74) *Attorney, Agent, or Firm* — C. Brandon Browning; Maynard Cooper & Gale, PC

(57) ABSTRACT

A flame detection apparatus is provided that provides low cost fire detection with improved false alarm discrimination and that includes at least two optical sensors, each configured with a Long Wave Pass IR filter with distinct minimum responsive wavelengths and arrayed to broadly sample the MWIR band.

15 Claims, 4 Drawing Sheets

APPARATUS FOR FLAME DISCRIMINATION UTILIZING LONG WAVELENGTH PASS FILTERS AND RELATED METHOD

FIELD DESCRIPTION OF THE PROBLEM AND RELATED ART

The present invention relates generally to apparatuses for optical detection of flames.

BACKGROUND

It is important that an optical flame detector is able to detect the presence of various types of flame in as reliable a manner as possible. This requires that the flame detector can discriminate between flames and other sources of infrared radiation. Commonly, optical flame detection is carried out in the infrared portion of the spectrum narrowed about 4.3 µm, a hydrocarbon emission peak.

An optical flame detector generally functions by analyzing portions of the spectrum emitted by a flame and/or analyzing the temporal flicker of that flame. Typically, the spectral signature of a flame in the Mid-Wave InfraRed (MWIR) spectrum (~3 µm to 5 µm) contains several key features that are not easily replicated by false alarm sources. The UV-C waveband from approximately 180 nm to 290 nm also contains unique spectral information that when combined with the MWIR helps to discriminate a flame based on its spectral signature.

In the prior art, simple flame detectors employ a single sensor, and a warning is provided whenever the signal sensed by the detector exceeds a particular threshold level. This simple approach suffers from false triggering, because it is unable to discriminate between flames and other bright objects, such as incandescent light bulbs, hot industrial processes such as welding, warm hands waved in front of the detector, a lit cigarette, and even sunlight.

Attempts have been made to overcome this problem by sensing radiation at two or more wavelengths. A comparison of the relative strengths of the signals sensed at each wavelength permits greater discrimination over false sources than when sensing at only a single wavelength. The prior art of optical flame detection utilizes several bandpass filters strategically chosen to provide a good measure of discrimination. A bandpass filter is generally accepted to have a well-defined lower, 50% of peak transmission, "cuton" wavelength and upper, 50% of peak transmission, "cutoff" wavelength. Furthermore, the bandpass filter will have a full-width, half maximum (FWHM) bandwidth from between 1% and 13% of the center wavelength. The bandpass, center wavelength, and number of filters are valuable tools for the system engineer; appropriate choices can offer good rejection of false alarms. For example, U.S. Pat. No. 5,995,008 to King, et al, discloses an optical fire detector apparatus employing at least two sensors configured with bandpass filters responsive to overlapping spectral bands. One bandpass filter is centered at 4.5 µm with a bandwidth of about 0.15 µm to insure sampling of $CO_2$, and a second bandpass filter is configured with a passband of about 0.35 µm and centered such that either the upper or the lower filter response boundary wavelength both filters are roughly coincident. According to King, et al., a third filter may be added to sample other parts of the spectrum.

Indeed, given enough resources, it is theoretically possible to design a system that will provide 100% rejection of all conceivable false alarms. Practically, however, the system engineer is limited in their choice of the number of filters that they can reasonably implement within a particular cost constraint. Additional filters quickly increase the cost of the sensor since each filter, a costly item itself, requires another sensor which is usually more expensive than the filter, as well as the lower cost items such as another preamplifier, another analog-to-digital converter channel, and more processing power. In addition, bandpass filters are generally more expensive the more narrow the chosen bandwidth. The lower bandwidths provide enhanced discrimination of flames, however, this increases the cost of the detector. Finally, the more narrow the bandwidth, the more sensitive the associated sensor must become in order to provide an adequate signal to noise ratio for the lesser number of photons arriving at the sensor. Given the practical limitations imposed by sensor cost on the optical flame detection method, the bandpass filter can produce more problems than it solves.

Some system engineers have sought to alleviate some of the cost of adding more bandpass filters to the system by utilizing pyroelectric detectors such as lithium tantalate ($LiTaO_3$). The pyroelectric detector is a lower cost solution than other MWIR detectors such as lead selenide (PbSe) and certainly less expensive than the more exotic detector materials such as indium arsenide (InAs), indium lead (InSb), mercury cadmium telluride (MCT), or mercury cadmium zinc telluride (MCZT). However, the pyroelectric detector suffers an intrinsic flaw when considering applications that require rugged detectors. Namely, any crystal that exhibits the pyroelectric effect must also, to some degree, exhibit a piezoelectric effect. In other words, pyroelectric detectors are sensitive to sounds and vibration, as well as electromagnetic radiation, and will output a response in proportion to both of these stimuli. This is highly undesirable when considering applications in which the noise and/or vibration environment is expected to be significant such as aircraft, land/sea vehicles, industrial operations, factories, etc.

SUMMARY

The present disclosure is directed to a flame detection apparatus configured with a plurality of optical sensors each having a long-wave pass (LWP) infrared filter, each of which are responsive to ranges of wavelengths in the IR portion of the spectrum, where one LWP filter is at least 50% responsive at a wavelength of about 4.17 µm. Other LWP filters used are designed to be at least 50% responsive at mutually different wavelengths, but such that at least the response spectrum of one filter is a subset of another.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements.

DETAILED DESCRIPTION

The various embodiments of the present invention and their advantages are best understood by referring to FIGS. 1 through 6 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Figure 1:
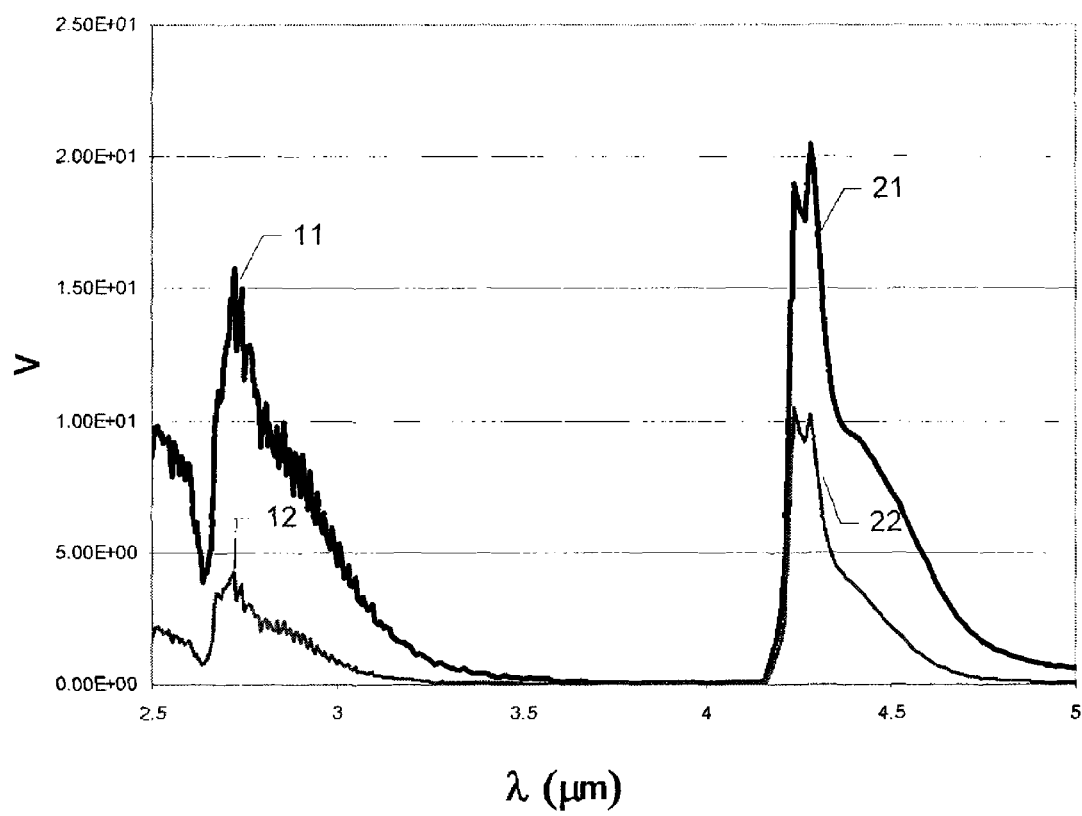
FIG. 1 is a graph showing the spectral characteristics of a hydrocarbon flame.

It is well known that hydrocarbon flames tend to exhibit IR spectral characteristics with a peak between about 4.3 μm to about 4.5 μm with the actual peak location being dependent upon distance to the flame as well as the flame temperature and amount of oxygen allowed to mix with the fuel. Reference is made to FIG. 1 which is a plot of observed IR spectral characteristics of a hydrocarbon flame. Two curves are shown. The first is represents the IR energy received from a "blue flame" and indicates two prominent peaks at approximately 4.3 μm (21), and at about 2.7-2.8 microns (11). The second curve represents IR energy from a "dirty flame" (lowest amount of oxygen mixing) with peaks occurring at roughly the same, or near the same wavelengths 22, 12, respectively, as that of the blue flame.

Figure 2:
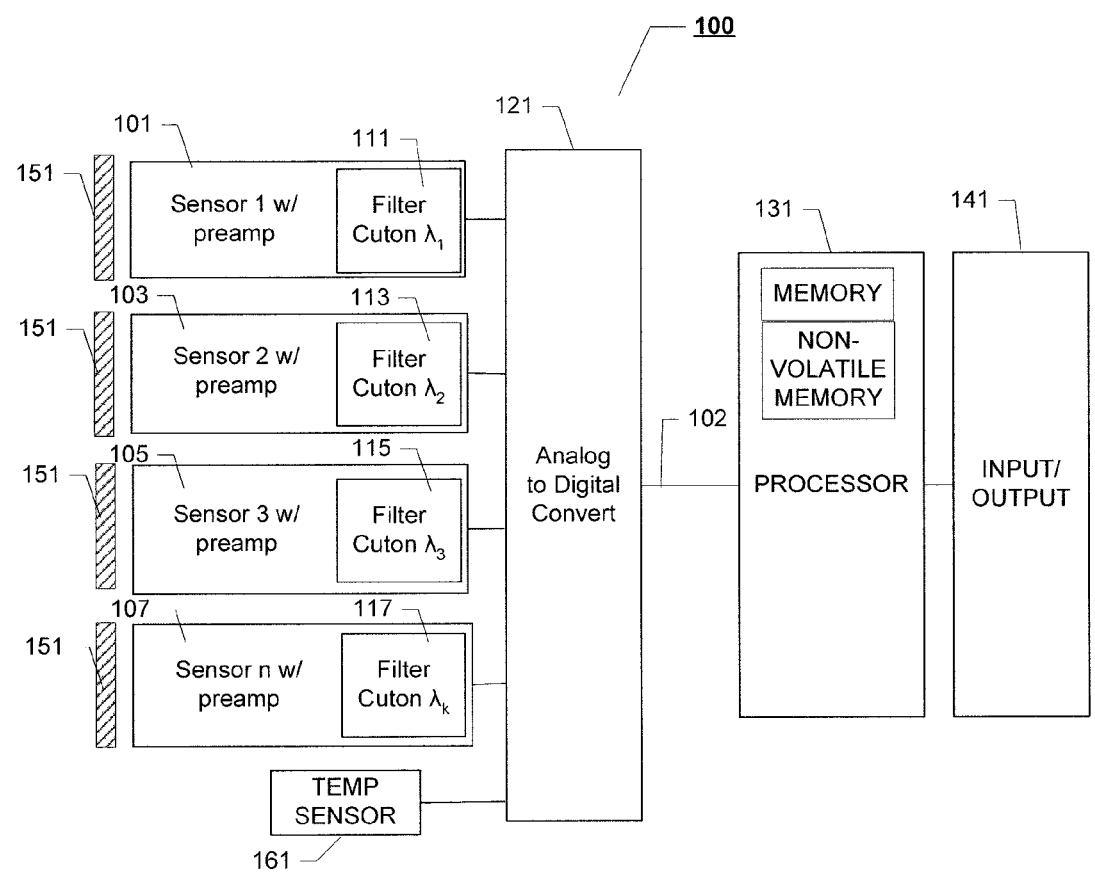
FIG. 2 is a functional diagram of an exemplary flame detection apparatus employing long wave pass filters.

With this spectrum in mind, the functional schematic depicted in FIG. 2 shows an exemplary flame detection apparatus 100 that includes a plurality of optical sensors 101, 103, 105. All sensors 101, 103, 105 are coupled to an analog-to-digital converter, or ADC, 121 which is further coupled to a processor 131 for processing according to a detection algorithm executed by a computer program stored on computer-readable media accessible by the processor 131. The processor 131 is responsive to an input/output device 141 which may including any one of a keypad, a display, aural indicators, such as one or more speakers, and visual indicators, such as light-emitting diodes, or the like. A temperature sensor 161 may also be included to indicate ambient temperature values for calibration purposes. Sensors 101, 103, and 105 may be configured with a dedicated amplifier to boost signal strength, as well as a transparent protective covering 151.

Figure 3:
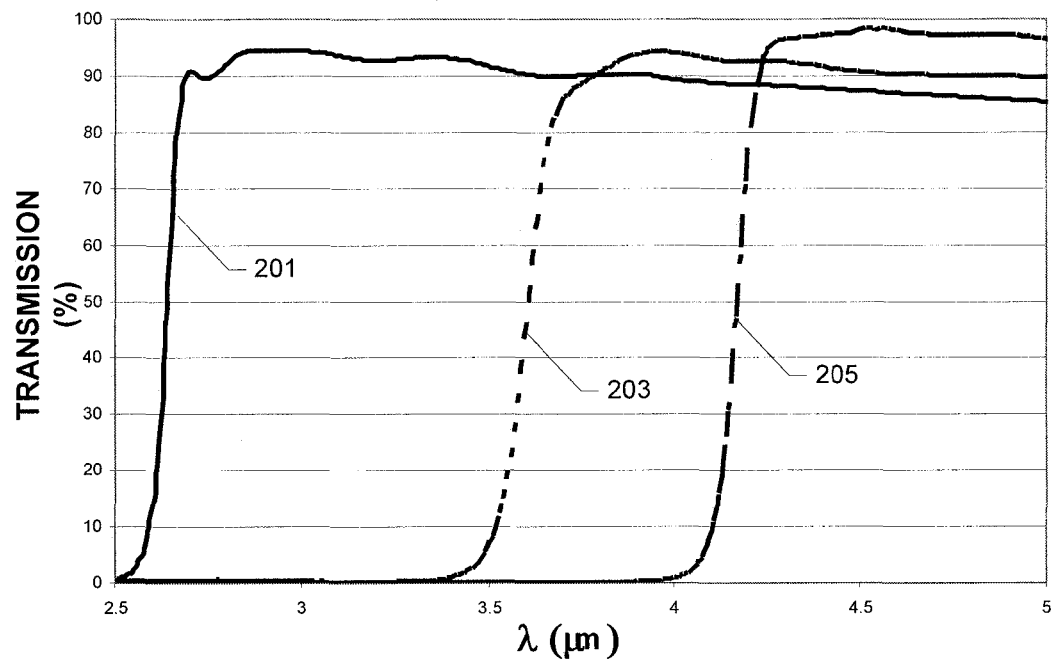
FIG. 3 depicts the spectral response of LWP filters selected and arranged according to one embodiment.

The optical sensors 101, 103, 105 each include a long wave pass (LWP) filter 111, 113, 115 which is designed to be responsive only above a predefined wavelength. For example, first filter 111 in this embodiment may be configured to respond at least at 50% output to a wavelength of about 2.55 μm and greater, with no long wave cut-off wavelength. A second filter 113 is configured to respond at least at 50% output to a wavelength of about 3.5 μm and greater, again with no long wave cut-off wavelength. A third optical sensor 105 includes a third filter 115 which is configured to be responsive, at least at 50%, to wavelengths above about 4.17 μm, with no long wave cut-off wavelength. FIG. 3 provides a graph of the resulting spectral response of the exemplary combination of LWP filters. As the graph illustrates, third filter 115 is configured to have a spectral response 205 that is a subset of the spectral response 203 second filter 113. Likewise, and the response 203 of the second filter is a subset of the spectral response 201 of the first filter 111.

Since few applications expose the expensive, relatively delicate, infrared filters to the environment, a protective covering 151 that can be easily cleaned is implemented. A feature of this invention is that this covering 151 is utilized to provide a common cutoff wavelength for the infrared filters. The cutoff wavelength may be provided by a property intrinsic to the covering material or it may be in the form of an applied coating to the interior of the covering or it may be a combination of the two. For such an application as described herein, a suitable covering 151 would be hard, durable, and scratch resistant. Transparent sapphire glass is an excellent material of choice for the detector since it offers an intrinsic 50% cutoff wavelength above 6 μm, as can be observed in the graph of sapphire glass transmittance characteristics in FIG. 5. Additionally, sapphire glass is chemically inert, and is mechanically sound. Thus the expense of another infrared coating is avoided.

Thus, to discriminate the flame from various false alarm sources, the flame detector utilizes several LWP filters arranged so that the spectral response of the filter responsive to the longer wavelength 113/115 is a subset of the spectral response of the filter responsive to shorter wavelength 111 with the protective covering providing the cutoff wavelength, but with different specified responsive short wavelengths. Some of the advantages of this approach are that the optical sensors have a much larger flux to sense, and that a larger portion of the IR spectrum can be sampled. The cuton wavelengths are chosen to provide the highest degree of discrimination possible. In practice, this requires that the cuton wavelength of one filter, namely, the filter intended to sense the 4.3 μm peak from a hydrocarbon fire (the third filter 115 in this example) be specified with tight tolerance to obtain the best performance. If the cuton wavelength of this filter is shifted too far to the shorter wavelengths, the $CO_2$ wavelength identity is lost amongst the competing false alarm sources and discrimination from false alarms suffers. If this filter's cuton wavelength is shifted too far to the longer wavelengths, the energy of the $CO_2$ peak is split between two filters and discrimination also suffers. The cuton wavelength of the remaining LWP filters needs to be well known but are allowed a much looser tolerance, thus further reducing the cost of the sensor.

The use of LWP filters and separate cutoff filters, in the form, perhaps, of a protective covering, rather than bandpass filters provides great advantages over previous solutions. First, the overall cost of the detector may be lower since these types of filters require fewer thin film layers to be deposited on the filter substrate compared to a bandpass filter. Second, optical systems are usually light-starved, and therefore the system designer has to either resort to expensive optical sensors made from exotic materials or accept a limitation in the range of the flame sensor. However, the LWP filter allows more light to pass through to the optical sensor thus boosting the signal to noise ratio of a particular optical sensor or to potentially allow a less expensive optical sensor to be utilized. Finally, the LWP filter is less sensitive to shifts in performance due to angle of incidence effects.

For example, a filter with a cuton wavelength of 4 μm compared to a 1.17% bandpass filter at 4 μm will experience less shift with angle of incidence. The LWP filter in this example would experience approximately 0.1 μm of shift at an angle of incidence of 40° while the 1.17% bandpass filter experiences approximately 0.23 μm of shift. An additional performance benefit with large angles of incidence is that the peak transmittance of the 1.17% bandpass filter is reduced by a factor of almost 2 while the LWP filter's peak transmittance shows very little appreciable change. In summary, the benefits of using a LWP filter compared to a bandpass filter are cost, increased optical power to the optical sensor, and much better performance with large angles of incidence.

It should be noted that a sensor's active area may be constructed from any material suitable for sensing the transmitted wavelength of the associated sensor. In some instances, the spectral response curve of the sensor will naturally provide a cutoff wavelength; when used in conjunction with a LWP filter, the resulting function is that of a very wide bandpass filter, i.e., roughly 5 µm. In other cases, the spectral cutoff of the sensor is among the least of concerns when compared to cost, size, sensitivity, operating temperature range, etc., and the effective cutoff wavelength of the sensor is located in the 20 µm to 50 µm range. In this case, the spectral transmission of the protective covering or even the substrate material of the LWP filter itself is likely to provide a cutoff wavelength of a much shorter wavelength.

The apparatus 100 receives IR energy through sensors 101, 103, 105 according to the wavelength permitted by the respective LWP filters 111, 113, 115. Any signal from sensors 101, 103, 105 is received by the ADC 121 which converts the analog signal and outputs a digital signal 102, which is received by the processor 131. The processor 131 executes programming which analyzes the digital signal 102 according to a detection algorithm. The processor 131, reads the input voltages 102 from the ADC, applies a correction factor based on the calibration, if necessary, and computes two ratios. Note that the ratios are only calculated if the detector having the largest effective bandpass (the first detector) is above a certain threshold. The first ratio is of second sensor 103 voltage signal divided by first sensor 101 voltage signal, and the second ratio is the third sensor 107 voltage signal divided by second sensor 105 voltage signal. A third ratio, which can be third sensor 107 divided by first sensor 101, can also be calculated directly but is mathematically redundant. The two resulting ratio values are compared to threshold values, and, if the thresholds are met, the processor 131 issues a command signal 104 to the I/O 141 to initiate an alarm. Using these example specifications, the detection algorithm would include exemplary values for comparison thresholds and issue the command to initiate an alert if the first ratio is between about 0.40 and about 0.85, the second ratio is greater than or equal to 0.85.

Figure 4:
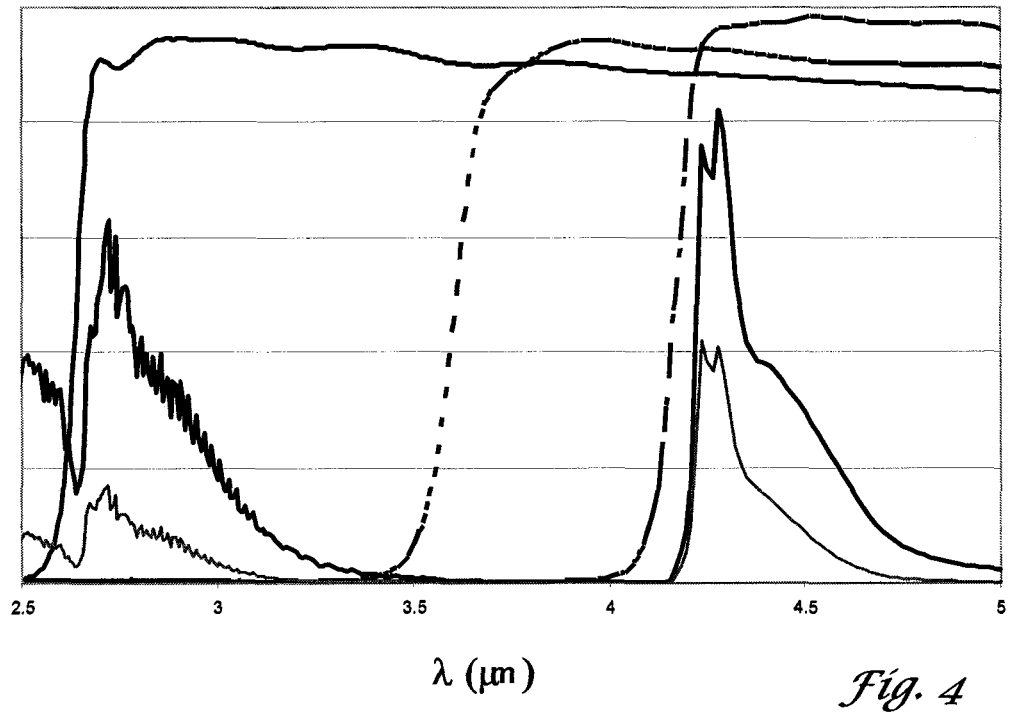
FIG. 4 is a graph, superimposing the spectral characteristic curve of the hydrocarbon flame of FIG. 1 over the spectral response curves of FIG. 3.
Figure 5:
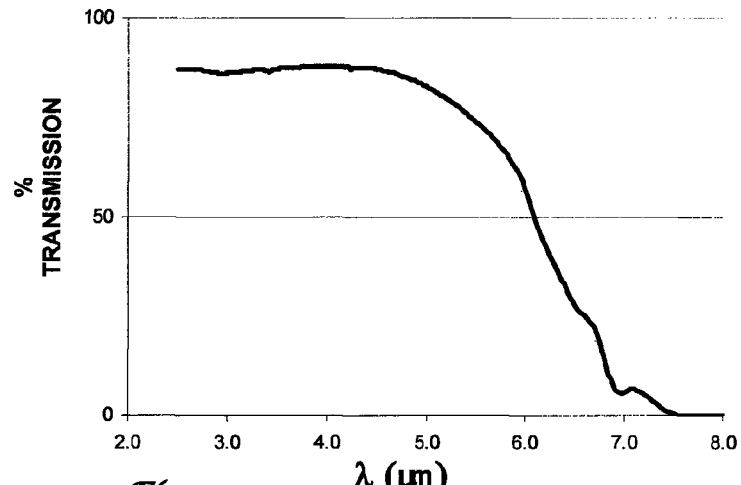
FIG. 5 is a graph illustrating the spectral transmittance characteristics of sapphire glass.

In the exemplary configuration of filters represented by the graph of FIG. 3, the first filter 111 (short wavelength) may have a 50% cuton wavelength of anywhere between about 2.3 µm to about 2.8 µm. The second filter 113 may have a 50% cuton wavelength of between about 3.2 µm to about 3.8 µm. However, because the third filter 115 includes the peak transmission wavelength for hydrocarbon flames (4.3 µm), the 50% cuton wavelength should be within about 1% of 4.17 µm. It will be appreciated that the detection algorithm threshold may need to be adjusted to accommodate the filter cuton wavelength chosen. FIG. 4 simply juxtaposes the spectral response curves of the LWPs with the spectral characteristics of a hydrocarbon fire to show the coverage, in terms of wavelength, that the described detector apparatus enables.

The described embodiment includes three sensors and associated filters, with an algorithm that computes two corresponding mathematically unique ratios. However, additional sensors (FIG. 2: 107) configured with wavelength LWP filters 117 would provide an additional margin of rejection of false alarms. These could be added in various other parts of the UV, visual, or IR portion of the spectrum to identify other spectral features of a flame. This does not preclude the addition of wavelength LWP filters 117 within the MWIR, it is simply a matter of locating the wavelength LWP filters 117 such that spectrally significant features of the flame spectra are sampled by the sensor 107 in order to identify those features. For instance, water emission bands at 2.7 µm, 1.9 µm, and even 1.4 µm may be part of a unique flame signature. Locating the additional filters around these wavelengths would be more advantageous than locating them in spectrally uninteresting areas where the spectra is too similar to that of a blackbody. Blackbody, or graybody, emitters are the source of many false alarms.

Conversely, while it is possible to utilize two wavelength LWP filters, the number of false alarms would be prohibitively high. Therefore, if the approach described above was utilized with only two sensors, a unique third sensor would be necessary to help reject the false alarms. This unique, third sensor may be something similar to a Geiger-Mueller detector that operates in the UV band and has a spectrally limited detection process due to the physics of the detector. This detection process of the GM detector is useful since it makes the detector blind to the solar wavelengths.

In addition, the detection algorithm may also calculate another set of ratios, termed "spectral flux ratios," for determining whether to initiate an alert using the effective bandwidths of the sensors, i.e., from the bandwidth from the filter cuton wavelength to the sensor effective cutoff wavelength. This method requires that the effective bandwidth, calculated from each LWP filter to the common cutoff wavelength provided by the protective covering, be utilized to normalize each voltage from each sensor before calculating a ratio. In this manner, a large voltage level from a sensor/filter combination having a relatively small effective bandwidth would produce a relatively large spectral flux as measured in Volts per µm. Conversely, a relatively small signal from a sensor/filter combination having a relatively large effective bandwidth would produce a relatively small spectral flux. This method simply attempts to account for the signal from each sensor in light of the associated bandwidth from that LWP filter and covering cutoff. For example, a third ratio is calculated as the voltage from first sensor divided by the bandwidth of the first sensor. Likewise the fourth and fifth ratios would be second sensor voltage divided by second sensor bandwidth, and third sensor voltage divided by third sensor bandwidth, respectively. Ideally, the processor should include logic to calculate all ratios, and compare against the proper thresholds.

Figure 6:
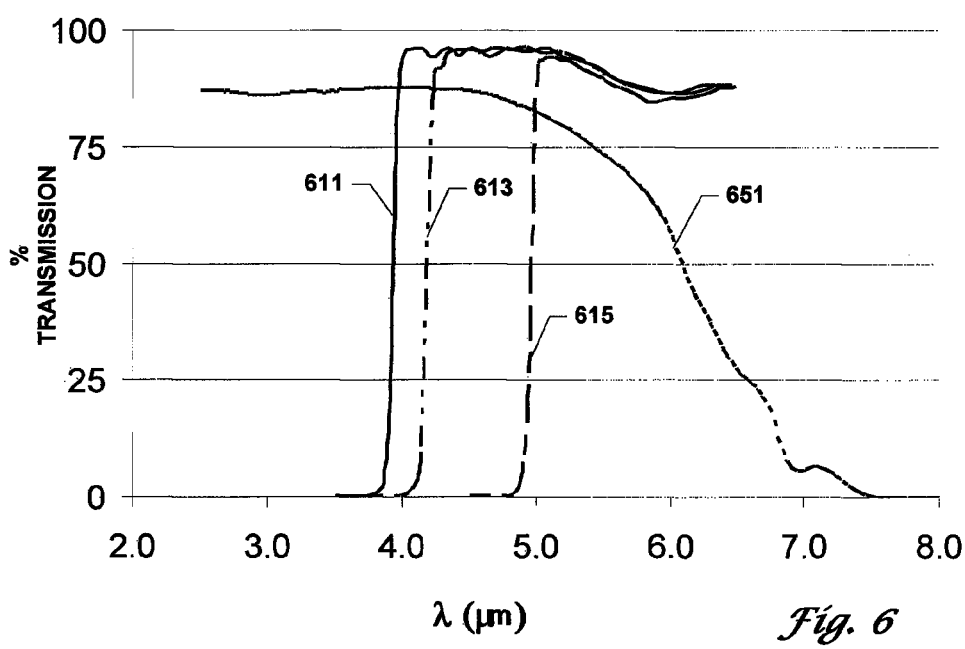
FIG. 6 is graph illustrating the spectral response curves of a different set of filters superimposed with the graph of FIG. 5.

It will be appreciated that the filters may be selected to be responsive to different wavelengths than those suggested above. FIG. 6 illustrates graphically the spectral response curves of an alternative combination of filters where, for example, the spectral response 611 of the shorter wavelength filter 111 could be 50% responsive or greater above about 3.93 µm. The spectral response 613 of the second filter 113 could be 50% responsive or greater above about 4.17 µm, and the spectral response 615 of the third filter could be 50% responsive or greater above about 4.96 µm. Also, the spectral transmittance response 651 of the sapphire protective glass is included in this graph to illustrate that the combination of the LWP filters 111, 113, 115, and the protective covering 151 effectively achieves bandpass filtering with a cutoff above about 6 µm, without the associated cost of a bandpass filter.

In an embodiment using three filters, the cuton wavelength of the first filter 111 may be chosen such that it is within a range of about −25% of the peak wavelength of the unique spectral feature desired to be detected such that the wavelength chosen is less than the cuton wavelength of the second filter 113. For example, in an application in which it is desired to detect a hydrocarbon flame, this peak location is approximately 4.25 µm. Those skilled in the relevant arts with the benefit of this disclosure will also recognize that the wavelength of the peak depends upon the distance from the flame to the sensor as well as the concentration of some atmospheric constituents. Thus, these factors should be considered when choosing filter specifications. The cuton wavelength of second filter 113 should be chosen so that it is located much closer to the unique spectral peak, for example, within about ±10% of the predicted peak wavelength. The cuton wavelength of the third filter 115 should be within about +25% of the peak wavelength of the unique spectral feature such that the wavelength chosen is greater than the cuton wavelength of second filter 113.

For embodiments in which a protective covering 151 is used, the covering material should be chosen such that the cutoff frequency is larger than the cuton wavelength of the third filter 115 in order to provide a sufficient signal to noise ratio for the detector being used. For example, in the exemplary embodiments described above, the cutoff wavelength should be within above +25% of the cuton wavelength of the third filter 15. For detector materials that exhibit a large detectivity (D*), this may be much smaller; even as small as 0% since the reference is to the 50% point of both the cutoff and cuton wavelengths. On the other hand, the atmosphere can act as the cutoff filter since the transmission between 5 μm and 8 μm is strongly diminished as the distance between the flame and the sensor increases. Accordingly, a protective covering that acts as a cutoff filter may not be necessary in those instances where the detector may be placed, for example, greater than 5 meters from a potential flame source.

The processor 131 can be implemented by a field programmable gated array (FPGA), micro-controller, a central processing unit (CPU) with a memory or other suitable logic device. The processor in effect comprises a computer system. Such a computer system includes, for example, one or more processors that are connected to a communication bus. The computer system can also include a main memory, preferably a random access memory (RAM), and can also include a secondary, non-volatile memory. The secondary memory can include, for example, a hard disk drive and/or a removable storage drive. The removable storage drive reads from and/or writes to a removable storage unit in a well-known manner. The removable storage unit, represents a disk, magnetic tape, optical disk, and the like, which is read by and written to by the removable storage drive. The removable storage unit includes a computer usable storage medium having stored therein computer software and/or data The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of the apparatus.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of a detection apparatus described above are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of a flame detection apparatus can be implemented according to the principles described above using a combination of both hardware and software.

As described above and shown in the associated drawings, the present invention comprises an apparatus for flame detection employing LWP IR filters. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A flame detection apparatus comprising: a first optical sensor comprising a first long wave pass filter, having a first spectral response; a second optical sensor comprising a second long wave pass filter having a second spectral response; and a third optical sensor comprising a third long wave pass filter having a third spectral response; and wherein said third spectral response is a subset of said second response, and said second response is a subset of said first spectral response.

2. The apparatus of claim 1, further comprising a protective covering.

3. The apparatus of claim 1, wherein said first, second and third spectral responses are specified at respective first, second and third minimum wavelengths above which each said filter responds at least at fifty percent transmittance, and wherein said first minimum wavelength is between about 2.3 μm and about 2.8 μm, said second minimum wavelength is between about 3.2 μm and about 3.8 μm, and said third minimum wavelength is within about 1% of 4.17 μm.

4. The apparatus of claim 1, wherein said first, second and third spectral responses are specified at respective first, second and third minimum wavelengths above which each said filter responds at least at fifty percent transmittance, and wherein said first minimum wavelength is about 3.93 μm, said second minimum wavelength is about 4.17 μm, and said third minimum wavelength is about 4.96 μm.

5. The apparatus of claim 1, wherein said first, second and third spectral responses are specified at respective first, second and third minimum wavelengths above which each said filter responds at least at fifty percent transmittance, and wherein said first minimum wavelength is no more than 25% less than a pre-defined peak wavelength, said second minimum wavelength is within 10% of said peak wavelength, and said third minimum wavelength is no more than 25% greater than said peak wavelength.

6. The apparatus of claim 5, further comprising a protective covering, said protective covering having a spectral transmittance such that only energies of wavelengths below a cutoff wavelength are passed therethrough.

7. The apparatus of claim 6, wherein said cutoff wavelength is no more than 25% greater than said third minimum wavelength.

8. The apparatus of claim 1, further comprising a computer-based processor for analyzing a first, second, and third signal received from said first, second and third sensor, and issuing a command signal, and an output responsive to said command signal.

9. The apparatus of claim 8, wherein said computer-based processor includes a computer-readable medium configured with control logic to command said processor to execute a detection method, said method comprising the steps of: comparing a first ratio to a first threshold, said first ratio being a ratio of said second signal to said first signal; and comparing a second ratio to a second threshold, said second ratio being a ratio of said third signal to said second signal.

10. The apparatus of claim 9, wherein said first, second and third spectral responses are specified at respective first, second and third minimum wavelengths above which each said filter responds at least at fifty percent transmittance, and wherein said first minimum wavelength is no more than 25% less than a pre-defined peak wavelength, said second minimum wavelength is within 10% of said peak wavelength, and said third minimum wavelength is no more than 25% greater than said peak wavelength.

11. The apparatus of claim 10, wherein said method further comprises the steps of: comparing a third ratio to a third threshold, said third ratio being a ratio of said first signal to said first spectral response; comparing a fourth ratio to a fourth threshold, said fourth ratio being a ratio of said second signal to said second spectral response; and comparing a fifth ratio to a fifth threshold, said fifth ratio being a ratio of said third signal to said third spectral response.

12. The apparatus of claim 8, wherein said computer-based processor includes a computer-readable medium configured with control logic to command said processor to execute a detection method, said method comprising the steps of: comparing a first ratio to a first threshold, said first ratio being a ratio of said first signal to said first spectral response; comparing a second ratio to a second threshold, said second ratio being a ratio of said second signal to said second spectral response; and comparing a third ratio to a third threshold, said third ratio being a ratio of said third signal to said third spectral response.

13. The apparatus of claim 12, wherein said first, second and third spectral responses are specified at respective first, second and third minimum wavelengths above which each said filter responds at least at fifty percent transmittance, and wherein said first minimum wavelength is no more than 25% less than a pre-defined peak wavelength, said second minimum wavelength is within 10% of said peak wavelength, and said third minimum wavelength is no more than 25% greater than said peak wavelength.

14. A flame detector comprising: at least three sensors, each of said sensors having a long wave pass filter and a unique spectral response at wavelengths between about 2 μm and 8 μm, wherein one of said sensors has a spectral response above a wavelength of about 4.17 μm, and wherein the spectral response of one sensor is comprised within the spectral responses of the other sensors.

15. The flame detector of claim 14, further comprising a protective covering, said protective covering having a spectral transmittance such that only energies of wavelengths below a cutoff wavelength are passed therethrough.

* * * * *